United States Patent [19]

Shutterly

[11] 4,065,795
[45] Dec. 27, 1977

[54] RECORDING TECHNIQUE FOR AN AUDIO/VIDEO PROGRAM WHEREIN THE AUDIO INCORPORATES VIDEO CHANGE SIGNALS

[75] Inventor: Harold B. Shutterly, Pittsburgh, Pa.

[73] Assignee: Westinghouse Electric Corporation, Pittsburgh, Pa.

[21] Appl. No.: 637,551

[22] Filed: Dec. 4, 1975

[51] Int. Cl.$^2$ ............... H04N 5/785; G11B 27/30
[52] U.S. Cl. ............... 360/35; 360/8; 360/9; 360/10; 360/19; 360/32; 360/72
[58] Field of Search ............... 360/8–10, 360/18–19, 24, 32, 33, 35, 72; 179/15.55 T; 358/127

[56] References Cited

U.S. PATENT DOCUMENTS

| | | | |
|---|---|---|---|
| 3,085,130 | 4/1963 | Lemelson | 360/19 |
| 3,715,481 | 2/1973 | Harr | 360/35 |
| 3,789,137 | 1/1974 | Newell | 179/15.55 T |
| 3,872,503 | 3/1975 | Shutterly | 179/15.55 T |
| 3,878,560 | 4/1975 | Ramage | 360/10 |
| 3,909,512 | 9/1975 | Omori et al. | 360/10 |
| 3,922,715 | 11/1975 | Hirashima | 360/19 |
| 3,934,268 | 1/1976 | Uemura | 360/101 |
| 3,938,189 | 2/1976 | Goldmark | 360/10 |

Primary Examiner—Raymond F. Cardillo, Jr.
Attorney, Agent, or Firm—M. P. Lynch

[57] ABSTRACT

In the recording of audio-video programs in which the audio is time-compressed and converted into television format, the video frames associated with a given audio frame are recorded in a group immediately following the audio frame, and picture-change cue signals are recorded at selected lines within the audio frame so that on playback, displayed video can be changed at preselected points in the audio frame playback. A number of video frames can be recorded between successive audio frames wihtout introducing any discontinuity in audio playback.

3 Claims, 3 Drawing Figures

RECORDING TECHNIQUE FOR AN AUDIO/VIDEO PROGRAM WHEREIN THE AUDIO INCORPORATES VIDEO CHANGE SIGNALS

CROSS REFERENCE TO RELATED APPLICATION

This application is closely related to the applicant's co-filed, copending patent application Ser. No. 637,552 filed Dec. 4, 1975, entitled A Playback Technique For A Stored Audio-Video Program which is assigned to the assignee of the present invention.

BACKGROUND OF THE INVENTION

The time compression of audio information into video bandwidth information and the further processing of time-compressed audio information into pseudo video information of a format comparable to a television line is disclosed in U.S. Pat. No. 3,789,137 issued Jan. 29, 1974, assigned to the assignee of the present invention and incorporated herein by reference. The technique discloses in the above-referenced U.S. patent, permits video transmission of many minutes of audio information in a few seconds. In the system of the above-identified U.S. patent, a single frame or field of video information is recorded on a separate recording track of a magnetic disc via a single moving head immediately prior to the recording of an accompanying audio track. A suitable technique for achieving the recording of audio and video tracks is described in U.S. Pat. No. 3,878,560, issued to W. W. Ramage on Apr. 15, 1975, assigned to the assignee of the present invention and incorporated herein by reference. During playback of the system of U.S. Pat. No. 3,789,137, each video frame is displayed for the entire period required to play back the corresponding audio track. In this system, pictures cannot be changed during an audio track playback.

SUMMARY OF THE INVENTION

There is disclosed herein with reference to the accompanying drawings an improved audio-video program recording technique which permits recording of successive video frames in an audio-video program with little or no audio discontinuity. The term audio lines as used hereafter, refers to the time-compressed audio lines of the type developed in accordance with the teachings of U.S. Pat. No. 3,789,137. Picture-change cue signals are recorded with selected audio lines so that picture changes can be made at any point in the recording of an audio track. This contrasts with the present program recorders which limit picture changes to the end of an audio track.

It is an object of the invention to provide a program recording system for interleaved video (single frames or fields) and audio fields or frames, in which the audio is recorded on separate sections or tracks of a magnetic recording medium, such as a disc or drum, leaving adjacent blank tracks in the audio recording for the later insertion of video signals having a program association with the audio lines of the preceding recorded audio track.

Furthermore it is an object of the invention to produce the above program recording system in which a large number of successive video frames may be recorded with little or no loss of audio continuity.

Another object of the above invention is to produce a program recording system in which the picture-change cue signals may be introduced in connection with the numerous audio lines on an audio track, rather than only at the end of an audio track. The picture-change cue signals recorded with the audio functions to control video presentation associated with the audio program during playback.

It is a further object of the above invention to provide a program recording system wherein the audio lines and video signals can be recorded simultaneously on separate tracks of a magnetic recording medium.

DESCRIPTION OF THE DRAWINGS

The invention will become more readily apparent from the following exemplary description in connection with the accompanying drawings.

DESCRIPTION OF THE INVENTION

Figure 1:
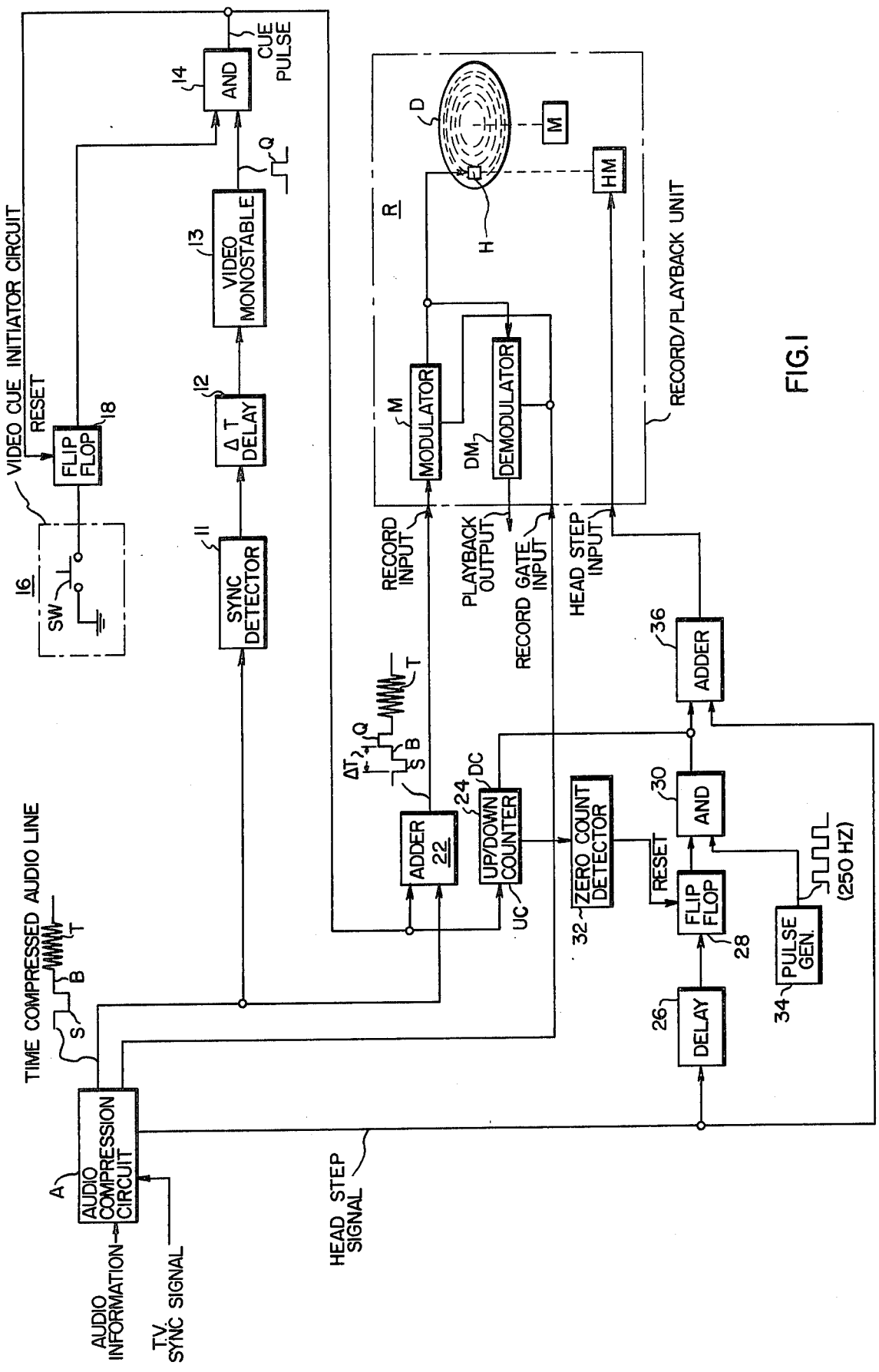
FIG. 1 is a schematic illustration of a technique for adding picture-change cue signals to recorded audio lines.

Referring to FIG. 1 there is schematically illustrated an audio recording system 10 for processing time-compressed audio lines produced by the audio compression circuit A in accordance with the teachings of the above referenced U.S. Pat. No. 3,789,137. The audio lines are recorded on the audio tracks of the disc D of a conventional record/playback R. As described in detail in U.S. Pat. No. 3,789,137, the audio compression circuit A accepts conventional audio information and television signal information and generates an audio line output signal, as illustrated in FIG. 1, consisting of a compressed audio segment T of a duration corresponding to the active portion of a television line, a television sync signal S and blank level B. The audio line, like a television line, is approximately 53 microseconds in duration.

The object of the invention is to permit the insertion of video cue signals Q during the blank signal B of selected audio lines recorded on an audio track of the disc D and to provide a number of blank tracks following the recorded audio track sufficient to accommodate the recording of video information corresponding to the number of video cue signals Q introduced in the audio lines of an audio track. For example, if three of the audio lines of the first recorded audio track each include a video cue signal Q, then the next three tracks of the disc D would be left blank to accommodate subsequent video information corresponding to the three video cue signals Q. The recording of the audio information would continue on the fifth track of the disc D. The schematic illustration of FIG. 1 represents a typical embodiment of a technique for introducing the video cue signals Q into selected audio lines and further providing the necessary blank recording tracks for the later recording of associated video information.

The audio line outputs from the audio line compression circuit A are supplied to sync detector circuit 11 and adder circuit 22. The sync detector circuit 11 responds to the presence of the sync pulse S of each audio line by generating an output signal which is delayed by the $\Delta T$ delay circuit 12 and subsequently applied to the video cue pulse mono-stable circuit 13 which responds by transmitting a video cue pulse of a predetermined width to a first input of the AND gate 14. Typically the width of the video cue pulse Q is 1 microsecond. The video cue signals Q are continuously produced in response to the sync signals of successive audio lines and supplied to the first input of the AND gate 14. The gating of a video cue pulse Q through the AND gate 14 to an input of the adder circuit 22 is controlled by the video cue pulse initiator circuit 16, herein illustrated as consisting of switch SW. While numerous techniques may be employed to automatically program the generation of gate signals to the second input of the AND gate 14 to gate video cue signals Q for inclusion with appropriate audio lines in the adder circuit 22, the manual switch SW represents a simplified approach suitable for the purposes of a clear understanding of the invention. The closing of switch SW of the video cue initiator circuit 16 causes flip-flop circuit 18 to gate the video cue pulse Q produced by the video cue pulse circuit 13 through the AND gate 14 to the adder circuit 22. The video cue pulse output from the AND gate 14 functions to reset the flip-flop 18 thereby removing the gating input signal to the AND gate 14 so as to prevent the gating of further video cue pulses Q through the AND gate 14 until a subsequent actuation of the switch SW. The adder circuit 22 functions to sum or combine the video cue pulse Q from the AND gate 14 with the audio line input signal from the audio compression circuit A to produce the resultant output waveform as illustrated. The function of the ΔT delay circuit 12, as is apparent from the output waveform of the adder circuit 22, is to position the video cue pulse Q at a location in the blank signal B of the audio line corresponding to the time duration ΔT, typically 10 microseconds, as measured from the leading edge of the sync pulse S. The output waveform of the adder circuit 22 in the absence of a Q pulse output from the AND gate 14 corresponds to the audio line output waveform of the audio compression circuit A. The audio line output information from the adder circuit 22 is supplied to the record input of the conventional record/playback unit R where it is supplied to a modulator circuit M for application to the recording head H for recording on an audio track of the disc D. Thus, the number of audio lines in a recorded audio track which includes a video cue pulse Q is determined by the number of actuations of switch SW. Thus a recorded audio track may include audio lines of which none include a video cue signal Q while other audio tracks may include one or more audio lines with video cue signals Q.

In order to determine the exact number of video cue signals introduced in audio track so that a corresponding number of adjacent blank tracks on the disc D can be allocated for the recording of associated video information, the video cue pulse output from the AND gate 14 is supplied to the upcount input UC of the up/down counter 24. Up/down counter 24 is a commercially available circuit available from suppliers such as Texas Instruments.

The up/down counter 24 counts in an upward sequence in response to each of the video cue pulse output signals from the AND gate 14 to a total count value corresponding to the total number of video cue pulses Q introduced in the audio lines of an audio track recorded on the disc D. The total video cue pulse count stored in the up/down counter 24 corresponds to the number of adjacent tracks in the disc D which are to be skipped by the head H before commencing further recording of audio lines. The head stepping signals applied to the head step input of the record/playback unit R are applied to the head step motor HM to achieve the desired movement of the head H across a number of disc tracks required for later recording of the video information associated with the recorded audio track.

At the conclusion of each track of compressed audio information developed by the audio compression circuit A, the audio compression circuit A generates a head step signal which is supplied as an input signal to the delay mono-stable circuit 26 and as a first input to the adder circuit 36. The head step signal triggers the delay mono-stable circuit 26 which generates an output signal to set the flip-flop circuit 28 in the absence of a reset signal from the zero count detector 32. The set condition of the flip-flop circuit 28 functions to open the AND gate 30 for the transmission of output pulses from the pulse generator 34 to a second input of the adder circuit 36.

The head step signal produced by the audio compression circuit A is transmitted through the adder circuit 36 to the head step input of the record/playback R to move the recording head H to the next track on the disc D. Additional head step input signals from the adder circuit 36, in the form of output pulses from pulse generator 34, is a function of the up count stored in the up/down counter 24. A zero count in the counter 24, corresponding to an audio track in which no video cue signals Q have been inserted, will result in a reset of flip-flop circuit 28 and no additional head step signals being transmitted through the adder circuit 36. In this instance, continuing audio information is recorded on the track of disc D which is immediately adjacent to the previously recorded audio track. However, assuming an up count value in counter 24 of three, corresponding to three video cue signals Q on the previously recorded audio track, there will be no reset output signal from the zero count detector 32, and the set condition of the flip-flop circuit 28 will cause AND gate 30 to transmit output pulses from pulse generator 34 through the AND gate 30 and the adder circuit 36 to serve as additional head step input signals to the record/playback unit R. Output pulses from the pulse generator 34, at a typical pulse repetition rate of 250 hertz have proven appropriate for establishing head stepping input pulses to the record/playback unit R. Each of the output pulses produced by the pulse generator 34 and gated to the AND gate 30 by the set condition of flip-flop circuit 38 is not only supplied as a head step input signal to the record/playback unit R but also serves an input signal to the down count input DC of the up/down counter 24. Thus, assuming the previous condition of an up count of three in the up/down counter 24, three successive output pulses from the pulse train generator 34 will cause the up/down counter 24 to count down to a zero count. Zero count detector 32 in turn repsonds to the zero count condition in the up/down counter 24 by applying a reset signal to the flip-flop 28 thus blocking any further transmission of output pulses from the pulse generator 34 through the AND gate 30. Thus a total of four head steps input signals will be supplied to the record/playback unit under these conditions, one head step input signal from the audio compression circuit A and three head step input signals from the output of AND gate 30. The total of four head step input signals will cause the head motor HM to step the head motor HM to step the head H four tracks, three corresponding to the three tracks set aside for subsequent recording of video information and one to position the head H on the next track available for continuing the recording of audio information. Following the completion of recording of the next audio track, the head step sequence is again initiated in the manner described above.

Figure 2:
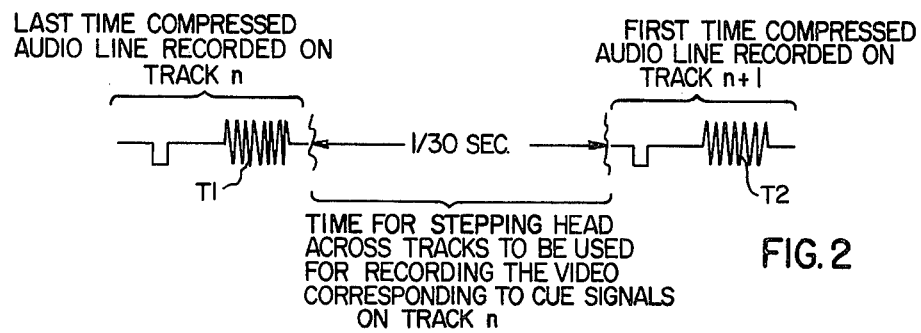
FIG. 2 is a waveform illustration of the recorded audio lines of FIG. 1.

As shown in FIG. 2, the time between the last audio line T1 recorded on an audio track n and the first audio line T2 recorded on the next audio track n + 1 is approximately 1/30 of a second. It is during this 1/30 of a second that the head stepping signals from the adder circuit 36 are generated. Inasmuch as the stepping of the head H takes place between recordings of audio lines, there is no loss in audio circuitry.

Figure 3:
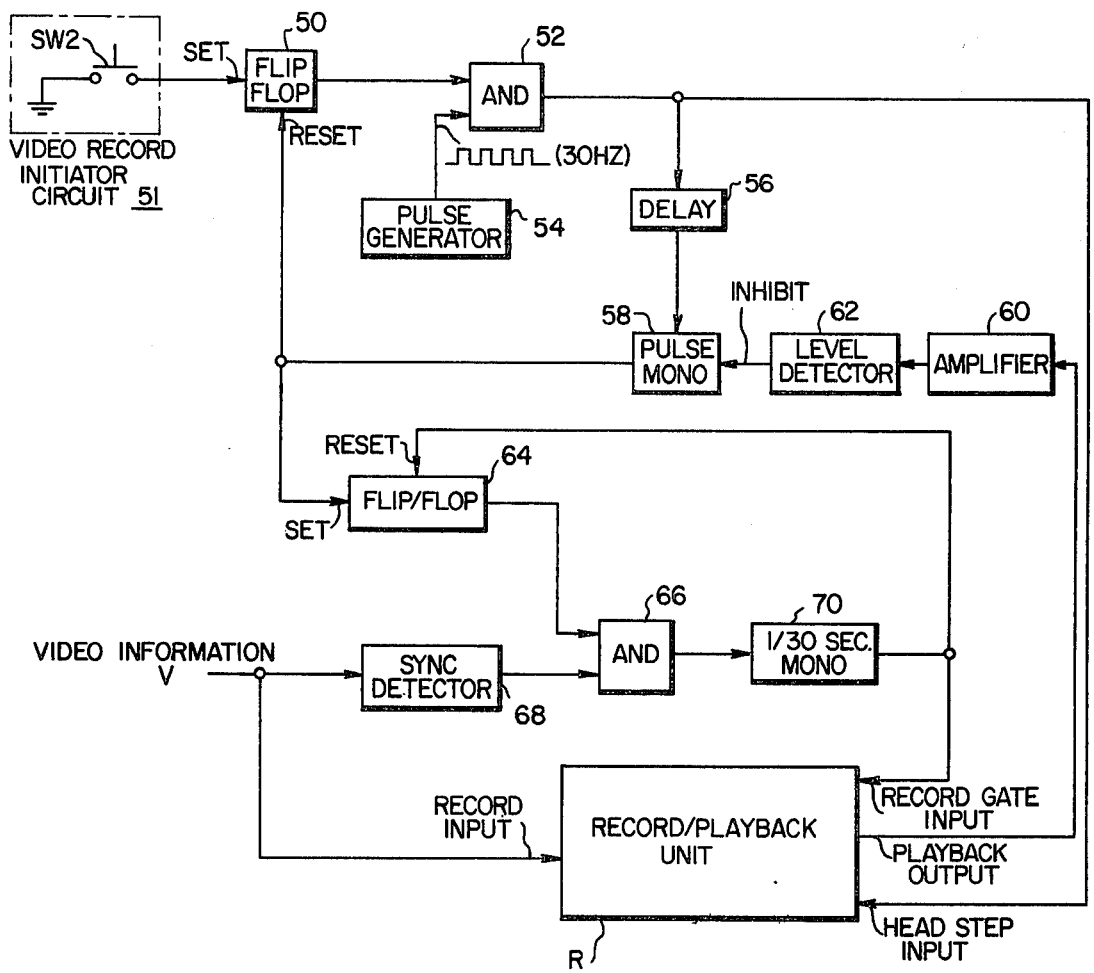
FIG. 3 is a schematic illustration of a technique for recording video information in combination with the audio lines of FIG. 1.

The recording of video information on the blank tracks provided by the operation of the audio recording technique of FIG. 1, is typically illustrated in the schematic embodiment of FIG. 3. The video information V supplied to the record input of the record/playback unit R and to the sync detector unit 68 can take the form of live television information from a camera, recorded video information from another disc recorder, recorded video information from different tracks on the same disc D from which the audio has been recorded, etc. The recording of the video information V onto the specified tracks of the disc D of the record/playback unit R is controlled by the video record initiator circuit 51, herein illustrated as consisting of switch SW2. The actuation of the switch SW2 sets flip-flop 50 thereby causing AND gate 52 to transmit output pulses from the pulse generator 54 which serve as both input pulses to the delay mono-stable circuit 56 and head step pulses to the head step input of the record/playback unit R. Each output pulse transmitted from the AND gate 52 triggers the delay mono-stable circuit 56 which in turn triggers the pulse mono-stable circuit 58. The output of the pulse mono-stable circuit 58 is inhibited by signals transmitted from the playback output of the record/playback unit R through the amplifier 60 and level detector 62 in the event the track being monitored is a recorded track. The presence of a recorded information on a track as amplified by amplifier 60 causes the level detector 62 to transmit and inhibit signal to the pulse mono-stable circuit 58. Once, however, the head H has been stepped to a blank track of the disc D, the output from the amplifier 60 will be insufficient to cause the level detector 62 to generate and inhibit signal, and an output signal from the pulse mono-stable circuit is transmitted to the reset input of the flip-flop circuit 50 and to the set input of flip-flop circuit 64. The resetting of flip-flop 50 terminates the transmission of output pulses from pulse generator 54 as head stepping input signals to record/playback unit R. Thus, recording head H is positioned on the first blank track encountered in the disc D suitable for recording video information. The setting of the flip-flop circuit 64 opens AND gate 66 to transmit the output pulses generated by the sync detector circuit 68 in response to the presence of sync pulses in the video information V. The output pulses from the sync detector circuit 68, which are gated through AND gate 66 by the set condition of flip-flop 64, are applied as input signals to the mono-stable circuit 70. Mono-stable circuit 70 responds to each output signal from the sync detector 68 gated through the AND gate 66 by resetting flip-flop 64 and transmitting a 1/30 of a second output pulse to the record gate input of the record/playback unit R. The 1/30 of a second output pulse from the mono-stable circuit 70 corresponds to one video frame and thus enables record/playback unit R to record one video frame of the video information V on the blank track. The resetting of the flip-flop 64 terminates the gate signal to the AND gate 66 and thus terminates the passage of sync detector signals to the mono-stable circuit 70. Thus, a single video frame is recorded on the first available blank track of the disc D in response to an actuation of the switch SW2. A second actuation of the switch SW2 will cause the recording head to be stepped to the next blank track and a second video frame will be recorded on the second blank track in a similar manner. This video recording process is repeated by subsequent actuations of switch SW2 until the recording of the video information V is completed. Once again, while the video record initiator circuit has been simply illustrated as consisting of a switch SW2 for the purpose of a clear understanding of the video recording mode, it is apparent that the video record initiator circuit 51 can be designed to automatically initiate the video record signals.

I claim:
1. A method for recording the audio frames or fields and the video frames or fields of an audio/video program on a sequential access storage medium, comprising the steps of:
   recording audio frames consisting of compressed audio information in television line format on the sequential access storage medium,
   inserting video change signals at predetermined locations within the recorded audio frames, and
   recording video frames corresponding in number to said predetermined number of video change signals in a sequential manner on said sequential access storage medium following said recorded audio frames.
2. Apparatus for recording the audio frames or fields and the video frames or fields of an audio/video program on a sequential access storage medium, comprising:
   first means for recording audio frames consisting of compressed audio information in television line format on the sequential access storage medium,
   second means for inserting video change signals at predetermined locations within the recorded audio frames, and
   third means for recording video frames corresponding in number to said predetermined number of video change signals in a sequential manner on said sequential access storage medium following said recorded audio frames.
3. Apparatus as claimed in claim 2 wherein said sequential access storage medium includes a disc having a plurality of tracks, each of said audio frames being recorded on a track, said video frames corresponding to the predetermined number of video change signals of the recorded audio frame being recorded on a sequential number of tracks immediately following the audio frame track, the number of tracks for recording said video frames corresponding to said predetermined number of video change cue signals, each video frame being recorded on a track.

* * * * *